United States Patent [19]

Badesha et al.

[11] Patent Number: 5,212,496
[45] Date of Patent: May 18, 1993

[54] COATED INK JET PRINTHEAD

[75] Inventors: Santokh S. Badesha; Reinhold E. Drews, both of Pittsford, N.Y.

[73] Assignee: Xerox Corporation, Stamford, Conn.

[21] Appl. No.: 589,747

[22] Filed: Sep. 28, 1990

[51] Int. Cl.$^5$ .............................. B41J 2/165
[52] U.S. Cl. ................... 346/1.1; 346/140 R; 428/447; 428/473.5
[58] Field of Search ............... 346/1.1, 140; 428/473.5, 447

[56] References Cited

U.S. PATENT DOCUMENTS

| | | | |
|---|---|---|---|
| 3,946,398 | 3/1976 | Kyser et al. | 346/1 |
| 4,030,948 | 6/1977 | Berger | 428/447 X |
| 4,368,476 | 1/1983 | Uehara et al. | 346/140 R |
| 4,378,564 | 3/1983 | Cross et al. | 346/75 |
| 4,499,149 | 2/1985 | Berger | 428/447 |
| 4,511,598 | 4/1985 | Creagh | 427/58 |
| 4,623,906 | 11/1986 | Chandrashekhar et al. | 346/140 R |
| 4,643,948 | 2/1987 | Diaz et al. | 428/422 |
| 4,723,129 | 2/1988 | Endo | 346/140 X |
| 4,725,862 | 2/1988 | Matsuzaki | 346/140 R |
| 4,728,392 | 3/1988 | Miura et al. | 156/644 |
| 4,734,706 | 3/1988 | Le et al. | 346/1.1 |
| 4,751,532 | 6/1988 | Fujimura et al. | 346/140 R |
| 4,968,757 | 11/1990 | Lee | 428/447 X |

FOREIGN PATENT DOCUMENTS 268213 5/1988 Japan .

OTHER PUBLICATIONS

Balanson et al; Low Energy Coating for Drop-on-Demand Silicon Nozzles; IBM TDB, vol. 23, No. 1, Jun. 1980, p. 294.

Primary Examiner—Joseph W. Hartary
Attorney, Agent, or Firm—Judith L. Byorick

[57] ABSTRACT

Disclosed is an ink jet recording head comprising a plurality of channels, wherein the channels are capable of being filled with ink from an ink supply and wherein the channels terminate in nozzles on one surface of the printhead, the surface being coated with a polyimide-siloxane block copolymer.

19 Claims, 3 Drawing Sheets

COATED INK JET PRINTHEAD

BACKGROUND OF THE INVENTION

The present invention is directed to ink jet recording apparatuses and processes. More specifically, the present invention is directed to printhead suitable for ink jet printing processes, said printheads being coated with a water repellent material. One embodiment of the present invention is directed to an ink jet printhead comprising a plurality of channels, wherein the channels are capable of being filled with ink from an ink supply and wherein the channels terminate in nozzles on one surface of the printhead, the surface being coated with a polyimide-siloxane block copolymer. In a specific embodiment, the polyimide-siloxane block copolymer is of the formula

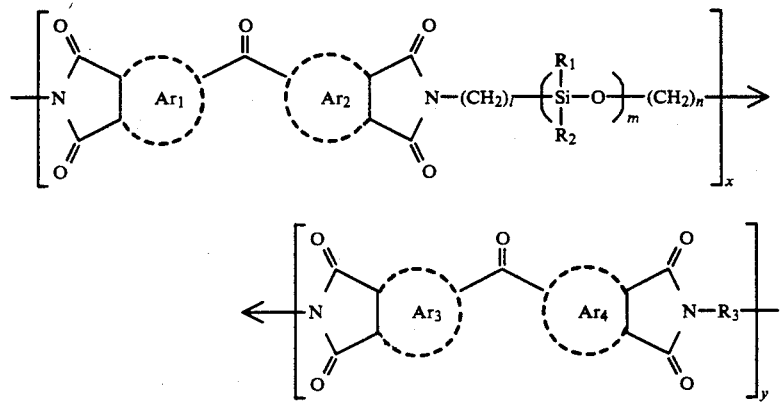

wherein x and y represent the numbers of repeating segments, the dotted circles $Ar_1$, $Ar_2$, $Ar_3$, and $Ar_4$ are independently selected from aromatic groups, l and n are numbers of from 1 to about 15, m is a number of from 1 to about 100, $R_1$ and $R_2$ are independently selected from alkyl groups, and $R_3$ represents an aliphatic or an aromatic group, and the polymer contains from about 1 to about 30 percent by weight of siloxane.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are different types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to vaporize almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses. At this point, the resistor is no longer being heated because the current pulse has passed and, concurrently with the bubble collapse, the droplet is propelled at a high rate of speed in a direction towards a recording medium. The surface of the printhead encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet equipment and processes are well known and are described in, for example, U.S. Pat. No. 4,601,777, U.S. Pat. No. 4,251,824, U.S. Pat. No. 4,410,899, U.S. Pat. No. 4,412,224, U.S. Pat. No. 4,532,530, and U.S. Pat. No. 4,774,530, the disclosures of each of which are totally incorporated herein by reference.

The present invention is suitable for ink jet printing processes, including drop-on-demand systems such as thermal ink jet printing, piezoelectric drop-on-demand printing, and the like.

In ink jet printing, a printhead is usually provided having one or more ink-filled channels communicating with an ink supply chamber at one end and having an opening at the opposite end, referred to as a nozzle. These printheads form images on a recording medium such as paper by expelling droplets of ink from the nozzles onto the recording medium. The ink forms a meniscus at each nozzle prior to being expelled in the form of a droplet. After a droplet is expelled, additional ink surges to the nozzle to reform the meniscus. An important property of a high quality printhead array is good jet directionality. Good jet directionality ensures that ink droplets can be placed precisely where desired on the print document. Poor jet directional accuracy leads to the generation of deformed characters and visually objectionable banding in half tone pictorial images.

A major source of ink jet misdirection is associated with improper wetting of the surface of the printhead which contains the array of nozzles. One factor which adversely affects jet directional accuracy is the interaction of ink accumulating on the surface of the printhead array with the ejected droplets. Ink may accumulate on the printhead surface either from overflow during the refill surge of ink or from the spatter of small satellite droplets during the process of expelling droplets from the printhead. When the accumulating ink on the printhead surface makes contact with ink in a channel (and in particular with the meniscus of ink protruding from a nozzle), it distorts the ink meniscus, resulting in an imbalance of the forces acting on the egressing droplet, which in turn leads to jet misdirection. This wetting phenomenon becomes more troublesome after extensive use as the array face oxidizes or becomes covered with a dried ink film, leading to a gradual deterioration of the image quality that the printhead is capable of generating. To retain good ink jet directionality, wetting of the surface of the printhead desirably is suppressed. Alternatively, if wetting can be controlled in a predictable, uniform manner, jet misdirection would not be a problem. Uniform wetting, however, is difficult to achieve and maintain.

In thermal ink jet printing, a thermal energy generator, usually a resistor, is located in the channels near the nozzles a predetermined distance therefrom. The resistors are individually addressed with a current pulse to momentarily vaporize the ink and form a bubble which expels an ink droplet. As the bubble grows, the ink bulges from the nozzle and is contained by the surface tension of the ink as a meniscus. The rapidly expanding vapor bubble pushes the column of ink filling the channel towards the nozzle. At the end of the current pulse the heater rapidly cools and the vapor bubble begins to collapse. However, because of inertia, most of the column of ink that received an impulse from the exploding bubble continues its forward motion and is ejected from the nozzle as an ink drop. As the bubble begins to collapse, the ink still in the channel between the nozzle and bubble starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight line direction towards a recording medium, such as paper. The collection of ink on the nozzle containing face of thermal ink jet printheads causes all of the problems discussed above.

Ink jet printheads include an array of nozzles and may, for example, be formed of silicon wafers using orientation dependent etching (ODE) techniques. The use of silicon wafers is advantageous because ODE techniques can form structures, such as nozzles, on silicon wafers in a highly precise manner. Moreover, these structures can be fabricated efficiently at low cost. The resulting nozzles are generally triangular in cross-section. Thermal ink jet printheads made by using the above-mentioned ODE techniques typically comprise a channel plate which contains a plurality of nozzle-defining channels located on a lower surface thereof bonded to a heater plate having a plurality of resistive heater elements formed on a upper surface thereof and arranged so that a heater element is located in each channel. The upper surface of the heater plate typically includes an insulative layer which is patterned to form recesses exposing the individual heating elements. This insulative layer is referred to as a "pit layer" and is sandwiched between the channel plate and heater plate so that the nozzle-containing front face has three layers: the channel plate, the pit layer and the heater plate. For examples of printheads employing this construction, see U.S. Pat. No. 4,774,530 and U.S. Pat. No. 4,829,324, the disclosures of which are totally incorporated herein by reference.

The heater and channel plates are typically formed from silicon. The pit layer sandwiched between the heater and channel plates, however, is formed from a polymer, an example being polyimide. Since the front face of the printhead where the channels terminate in nozzles is made from different materials, a coating material, such as a water-repellent material, generally is not likely to adhere equally well to these different materials, resulting in a coating which is not uniformly ink-repellent. Thus, it is difficult to provide a surface coating which is uniformly ink-repellent in ink jet printheads formed from multiple layers.

Additionally, ink jet printers typically employ inks which contains a glycol and water. Glycols and other similar materials are referred to as humectants, which are substances which promote the retention of moisture. For a coating material to be effective for any length of time, it must both repel and be resistant to glycol-containing inks.

Further, it is difficult to apply a coating to the surface of an ink jet nozzle. While it is desirable to suppress the wetting property of the nozzle jet surface, it is undesirable to allow any coating material to enter the channels to the nozzle. A key requirement for good directionality is that the interior channel walls not be coated. If the walls of the channels become coated with ink-repellent material, proper refill of the channel is inhibited. Refill of each channel depends on surface tension and must be completed in time for subsequent volleys of drops to be fired. If the refill process is not complete by the time the next drop is fired, the meniscus may not be flush with the outer edge of the nozzle orifice, resulting in misdirection. Further, an incompletely filled channel causes drop size variability, which also leads to print quality degradation.

Thus, misdirection of droplets of ink ejected from a thermal ink jet printhead is frequently caused by the interaction of droplets jetted from the nozzles with ink accumulated on the surface of the array of nozzles. Since thermal ink jet inks generally are water-based compositions, the accumulation of ink on the printhead surface can be reduced or eliminated by treating the surface so as to render it hydrophobic and non-wetting by, for example, coating the printhead surface in the vicinity of the nozzles with a water repellent material. A suitable water repellent material generally should form films well, be easily applied to a surface, exhibit excellent adhesion to the materials from which ink jet printheads are typically made, form uniform, smooth films of thicknesses of a few microns or less, exhibit good abrasion resistance to be able to withstand frequent wiping during maintenance as well as normal wear from the jetting process, and be capable of being applied to the surface of the array of nozzles without contacting the walls of the nozzles.

Coatings for ink jet nozzles are known. For example, U.S. Pat. No. 4,643,948 (Diaz et al.), the disclosure of which is totally incorporated herein by reference, discloses a film coating for an ink jet nozzle plate comprising a partially fluorinated alkyl silane and a perfluorinated alkane.

In addition, U.S. Pat. No. 3,946,398 (Kyser et al.), the disclosure of which is totally incorporated herein by reference, discloses a recording apparatus which includes a writing fluid source feeding a drop projection means which ejects a series of droplets of writing fluid from a nozzle in a discontinuous stream with sufficient energy to traverse a substantially straight trajectory to a recording medium. The volume of each droplet is individually controlled by electrical pulses applied to the projection means from an electronic driver. A plurality of such projection means may be employed and connected to control means whereby to print or form predetermined graphical intelligence patterns on a record medium. To prevent wetting of the printing head by the ink, water based inks are used and the printing head surface is coated with Teflon.

Further, U.S. Pat. No. 4,751,532 (Fujimura et al.), the disclosure of which is totally incorporated herein by reference, discloses an ink jet printhead wherein thermal energy and an electroelastic field are applied to ink held between two plate members to cause the ink to be jetted out from an orifice defined by the plate members wherein there is provided, on the orifice-side end portions of each of the plate members adjacent the orifice, a first area readily wettable by the ink and a second area away from the orifice which is less wettable by the ink. Examples of materials suitable for coating portions of the plate members include silicone-type resins and fluorocarbon-type resins.

Additionally, U.S. Pat. No. 4,368,476 (Uehara et al.) discloses ink jet printheads which are treated with a compound represented as $RSiX_3$, wherein R is a fluorine containing group and X is halogen, hydroxyl or a hydrolyzable group. The ink jet printhead may contain a number of differing materials, and accordingly, it is difficult to provide uniform coating.

U.S. Pat. No. 4,734,706 (le et al.) discloses a printhead for an ink jet printer having a protective membrane formed over the ink orifice. A viscoelastic and ink-immiscible fluid is used to form the membrane over the ink orifice. The membrane may comprise a silicone oil such as polydimethylsilicone polymers. The membrane lies in a plane perpendicular to the direction of emission of ink drops, and provides a barrier between the ink orifice and the external atmosphere, thus inhibiting evaporation of ink and the entry of contaminants. Wetting of the exterior surface of the ink jet head by the flow of ink through the ink orifice is also inhibited.

U.S. Pat. No. 4,728,392 (Miura et al.) discloses an ink jet printer of the electro-pneumatic type wherein an inner surface of a front nozzle plate and an end face of a rear nozzle member may be coated with a thin layer of an ink-repellent material. The ink-repellent material may be an ethylene tetrafluoride resin such as Teflon, or a fluoride containing polymer. Miura et al. also discloses blowing air through a nozzle while an ink-repellent material is applied thereto to prevent clogging of the nozzle. The nozzle-containing face of Miura et al. is made from one material.

U.S. Pat. No. 4,5623,906 (Chandrashekhar et al.) discloses a surface coating for ink jet nozzles. The coating includes a first layer of silicon nitride, an intermediate layer graded in composition, and a top-most layer of aluminum nitride.

Other disclosures of interest with respect to ink jet printers include U.S. Pat. No. 4,378,564 (Cross et al.), U.S. Pat. No. 4,511,598 (Creagh), and U.S. Pat. No. 4,725,862 (Matsuzaki), the disclosures of each of which are totally incorporated herein by reference.

U.S. Pat. No. 5,136,310, the disclosure of which is totally incorporated herein by reference, discloses an ink-repellent coating for a front face of a thermal ink jet printhead. Alkyl polysiloxanes, chlorosilanes and other ink-repellent materials are used to treat thermal ink jet nozzles in order to control their wetting characteristics to improve jet directionality and to prevent accumulation of debris on the array face. An intermediate layer of silica formed between the ink jet face and the ink-repellent layer may be provided so that the ink-repellent layer is isotropically hydrophobic. A method for applying the ink-repellent coating is provided in which an intermediate layer is formed by electron beam evaporation or sputtering, and an ink-repellent layer is applied by dipping in solution, wiping, spray coating, or the like, while blowing air through the channels of the ink jet.

While known compositions and processes are suitable for their intended purposes, a need remains for ink jet printing apparatuses wherein the front face of the printhead is coated with a water repellent material. In addition, a need remains for coatings for ink jet printing apparatuses that are easy to apply and form films well. Further, there is a need for coatings for ink jet printing apparatuses that exhibit excellent adhesion to materials from which ink jet printheads are typically made, such as silicon materials and polyimides. There is also a need for coatings for ink jet printing apparatuses that can form uniform, smooth films of a thickness of a few microns or less. A need also remains for coatings for ink jet printing apparatuses that can be applied to the surface of a printhead having an array of jetting nozzles without coating the ink conveying channels that terminate on the surface of the printhead. Additionally, there is a need for coatings for ink jet printing apparatuses that exhibit good abrasion resistance and are capable of withstanding frequent wiping during maintenance of ink jet printheads as well as withstanding normal wear from the jetting process. Further, a need exists for ink jet printheads that prevent the accumulation of ink and other material on the nozzle-containing face and thus maintain good ink jet directionality. In addition, there is a need for ink-repellent coating materials for an ink jet printhead which render the nozzle containing surface of the printhead uniformly ink-repellent even when the nozzle-containing surface is made from a plurality of different materials. There is also a need for coating materials for ink jet printheads which are compatible with glycol-containing inks, are stable over long periods of time and are free from unwanted material build-up during deposition on the nozzle face. A need also exists for coatings for ink jet printing apparatuses that retain ink repellent properties in the presence of ink additives such as surfactants that are included in the ink to promote rapid ink drying times. Further, there is a need for coatings for ink jet printing apparatuses that are of low cost and easy to apply and that result in a good yield of high quality, reproducible coatings.

SUMMARY OF THE INVENTION

It is an object of the present invention to provide ink jet printing apparatuses wherein the front face of the printhead is coated with a water repellent material.

It is another object of the present invention to provide coatings for ink jet printing apparatuses that are easy to apply and form films well.

It is yet another object of the present invention to provide coatings for ink jet printing apparatuses that exhibit excellent adhesion to materials from which ink jet printheads are typically made, such as silicon materials and polyimides.

It is still another object of the present invention to provide coatings for ink jet printing apparatuses that can form uniform, smooth films of a thickness of a few microns or less.

Another object of the present invention is to provide coatings for ink jet printing apparatuses that can be applied to the surface of a printhead having an array of jetting nozzles without coating the ink conveying channels that terminate on the surface of the printhead.

Yet another object of the present invention is to provide coatings for ink jet printing apparatuses that exhibit good abrasion resistance and are capable of withstanding frequent wiping during maintenance of ink jet printheads as well as withstanding normal wear from the jetting process.

Still another object of the present invention is to provide ink jet printheads that prevent the accumulation of ink and other material on the nozzle-containing face and thus maintaining good ink jet directionality.

It is another object of the present invention to provide ink-repellent coating materials for an ink jet printhead which render the nozzle containing surface of the printhead uniformly ink-repellent even when the nozzle-containing surface is made from a plurality of different materials.

It is yet another object of the present invention to provide coating materials for ink jet printheads which are compatible with glycol-containing inks, are stable over long periods of time and are free from unwanted material build-up during deposition on the nozzle face.

It is still another object of the present invention to provide coatings for ink jet printing apparatuses that retain ink repellent properties in the presence of ink additives such as surfactants that are included in the ink to promote rapid ink drying times.

Another object of the present invention is to provide coatings for ink jet printing apparatuses that are of low cost and easy to apply and that result in a good yield of high quality, reproducible coatings.

These and other objects of the present invention (or specific embodiments thereof) can be achieved by providing an ink jet printhead comprising a plurality of channels, wherein the channels are capable of being filled with ink from an ink supply and wherein the channels terminate in nozzles on one surface of the printhead, the surface being coated with a polyamide-siloxane block copolymer. In a specific embodiment, the polyimide-siloxane block copolymer is of the formula

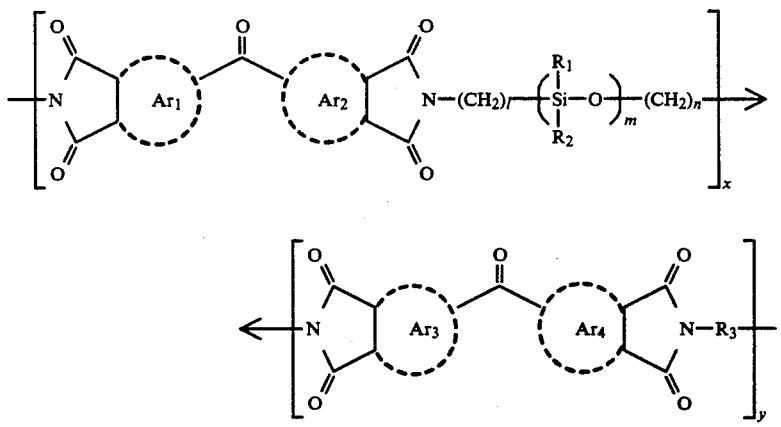

wherein x and y represent the numbers of repeating segments, the dotted circles $Ar_1$, $Ar_2$, $Ar_3$, and $Ar_4$ are independently selected from aromatic groups, l and n are numbers of from 1 to about 15, m is a number of from 1 to about 100, $R_1$ and $R_2$ are independently selected from alkyl groups, and $R_3$ represents an aliphatic or an aromatic group, and the polymer contains from about 1 to about 30 percent by weight of siloxane. Another embodiment of the present invention is directed to an ink jet printhead wherein the coating is a material of the formula

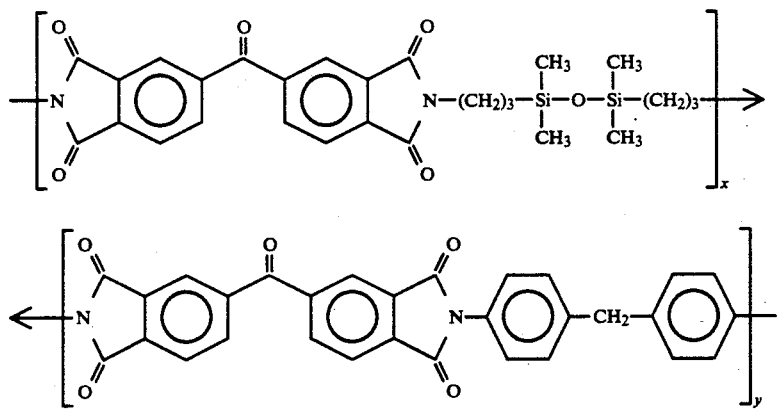

wherein x and y represent the numbers of repeating segments. Yet another embodiment of the present invention is directed to an ink jet printing process which comprises (1) providing an ink jet printhead comprising a plurality of channels, wherein the channels are capable of being filled with ink from an ink supply and wherein the channels terminate in nozzles on one surface of the printhead, the surface being coated with a polyimide-siloxane copolymer; (2) filling the channels with an ink; and (3) causing droplets of ink to be expelled from the nozzles onto a receiver sheet in an image pattern. A specific embodiment of this process is directed to a thermal ink jet printing process, wherein the droplets of ink are caused to be expelled from the nozzles by heating selected channels in an image pattern.

DETAILED DESCRIPTION OF THE PREFERRED EMBODIMENTS

Figure 1:
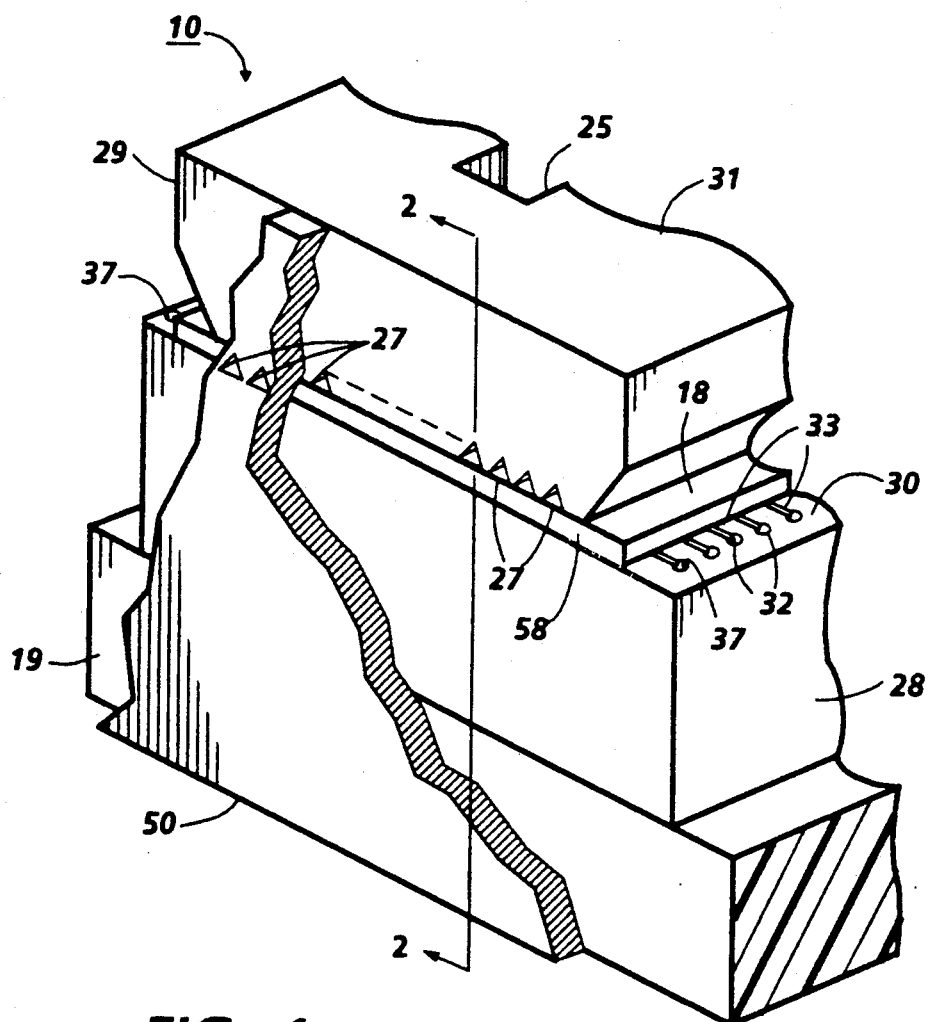
FIG. 1 is an enlarged isometric view of an example of a printhead mounted on a daughter board showing the droplet emitting nozzles.

The printhead of the present invention can be of any suitable configuration. An example of a suitable configuration, suitable in this instance for thermal ink jet printing, is illustrated schematically in FIG. 1, which depicts an enlarged, schematic isometric view of the front face 29 of a printhead 10 showing the array of droplet emitting nozzles 27. Referring also to FIG. 2, discussed later, the lower electrically insulating substrate or heating element plate 28 has the heating elements 34 and addressing electrodes 33 patterned on surface 30 thereof, while the upper substrate or channel plate 31 has parallel grooves 20 which extend in one direction and penetrate through the upper substrate front face edge 29. The other end of grooves 20 terminate at slanted wall 21, the floor 41 of the internal recess 24 which is used as the ink supply manifold for the capillary filled ink channels 20, has an opening 25 therethrough for use an an ink fill hole. The surface of the channel plate with the grooves are aligned and bonded to the heater plate 28, so that a respective one of the plurality of heating elements 34 is positioned in each channel, formed by grooves and the lower substrate or heater plate. Ink enters the manifold formed by the recess 24 and the lower substrate 28 through the fill hole 25 and by capillary action, fills the channels 20 by flowing through an elongated recess 38 formed in the thick film insulative layer 18. The ink at each nozzle forms a meniscus, the surface tension of which prevents the ink from weeping therefrom. The addressing electrodes 33 on the lower substrate or channel plate 28 terminate at terminals 32. The upper substrate or channel plate 31 is smaller than that of the lower substrate in order that the electrode terminals 32 are exposed and available for wire bonding to the electrodes on the daughter board 19, on which the printhead 10 is permanently mounted. Layer 18 is a thick film passivation layer, discussed later, sandwiched between upper and lower substrates. This layer is etched to expose the heating elements, thus placing them in a pit, and is etched to from the elongated recess to enable ink flow between the manifold 24 and the ink channels 20. In addition, the thick film insulative layer is etched to expose the electrode terminals.

Figure 2:
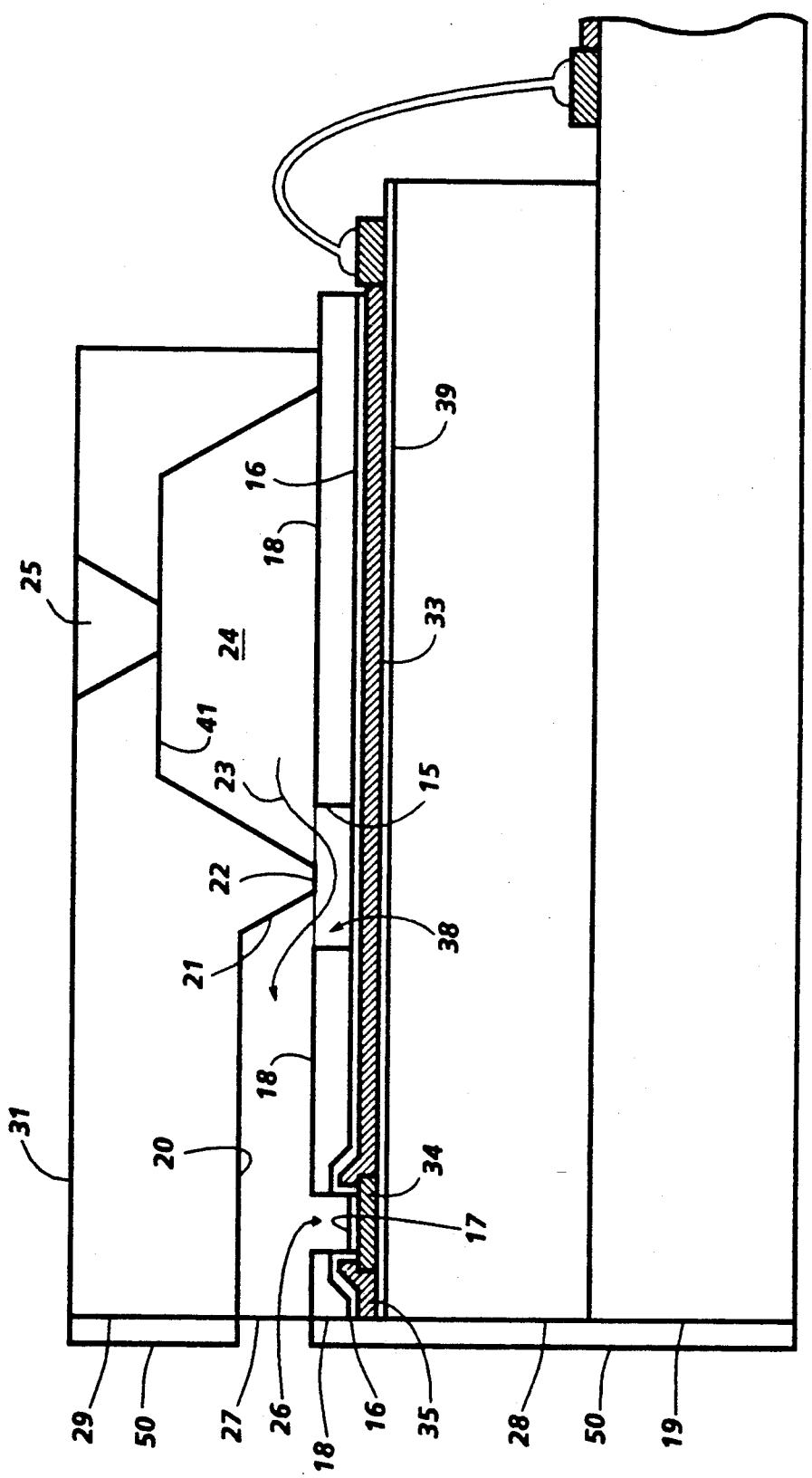
FIG. 2 is an enlarged cross-sectional view of FIG. 1 as viewed along the line 2—2 thereof and showing the electrode passivation and ink flow path between the manifold and the ink channels.

A cross sectional view of FIG. 1 is taken along view line 2—2 through one channel and shown as FIG. 2 to show how the ink flows from the manifold 24 and around the end 21 of the groove 20 as depicted by arrow 23. As is disclosed in U.S. Pat. No. 4,638,337 to Torpey et al, the disclosure of which is totally incorporated herein by reference, a plurality of sets of bubble generating heating elements 34 and their addressing electrodes 33 are patterned on the polished surface of a single side polished (100) silicon wafer. Prior to patterning, the multiple sets of printhead electrodes 33, the resistive material that serves as the heating elements, and the common return 35, the polished surface of the wafer is coated with an underglaze layer 39 such as silicon dioxide, having a typical thickness of about 2 microns. The resistive material can be a doped polycrystalline silicon, which can be deposited by chemical vapor deposition (CVD) or any other well known resistive material such as zirconium boride ($ZrB_2$). The common return and the addressing electrodes are typically aluminum leads deposited on the underglaze and over the edges of the heating elements. The common return ends or terminals 37 and addressing electrode terminals 32 are positioned at predetermined locations to allow clearance for wire bonding to the electrodes (not shown) of the daughter board 19, after the channel plate 31 is attached to make a printhead. The common return 35 and the addressing electrodes 33 are deposited to a thickness of 0.5 to 3 microns, with the preferred thickness being 1.5 microns.

In one embodiment, polysilicon heating elements are used and a silicon dioxide thermal oxide layer 17 is grown from the polysilicon in high temperature steam. The thermal oxide layer is typically grown to a thickness of 0.5 to 1 micron to protect and insulate the heating elements from the conductive ink. The thermal oxide is removed at the edges of the polysilicon heating elements for attachment of the addressing electrodes and common return, which are then patterned and deposited. If a resistive material such as zirconium boride is used for the heating elements, then other suitable well known insulative materials can be used for the protective layer thereover. Before electrode passivation, a tantalum (Ta) layer (not shown) can be optionally deposited, typically to a thickness of about 1 micron on the heating element protective layer 17 for added protection thereof against the cavitational forces generated by the collapsing ink vapor bubbles during printhead operation. The tantalum layer is etched off all but the protective layer 17 directly over the heating elements using, for example, $CF_4/O_2$ plasma etching. For electrode passivation, a two micron thick phosphorous doped CVD silicon dioxide film 16 is deposited over the entire wafer surface, including the plurality of sets of heating elements and addressing electrodes. The passivation film 16 provides an ion barrier which will protect the exposed electrodes from the ink. Other ion barriers can be used, such as, for example, polyimide, plasma nitrite, as well as the above-mentioned phosphorous doped silicon dioxide, or any combinations thereof. An effective ion barrier layer is generally achieved when its thickness is from about 1000 Angstroms to about 10 microns, with the preferred thickness being about 1 micron. The passivation film or layer 16 is etched off of the terminal ends of the common return and addressing electrodes for wire bonding later with the daughter board electrodes. This etching of the silicon dioxide film can be by either the wet or dry etching method. Alternatively, the electrode passivation can be by plasma deposited silicon nitride ($Si_3N_4$).

Next, a thick film type insulative layer 18 such as, for example Riston ®, Vacrel ®, Probimer 52 ®, or polyimide, is formed on the passivation layer 16, typically having a thickness of from about 10 to about 100 microns and preferably in the range of from about 25 to about 50 microns. The insulative layer 18 is photolithographically processed to enable etching and removal of those portions of the layer 18 over each heating element (forming recesses 26), the elongated recess 38 for providing ink passage from the manifold 24 to the ink channels 20, and over each electrode terminal 32, 37. The elongated recess 38 is formed by the removal of this portion of the thick film layer 18. Thus, the passivation layer 16 alone protects the electrodes 33 from exposure to the ink in this elongated recess 38.

Figure 3:
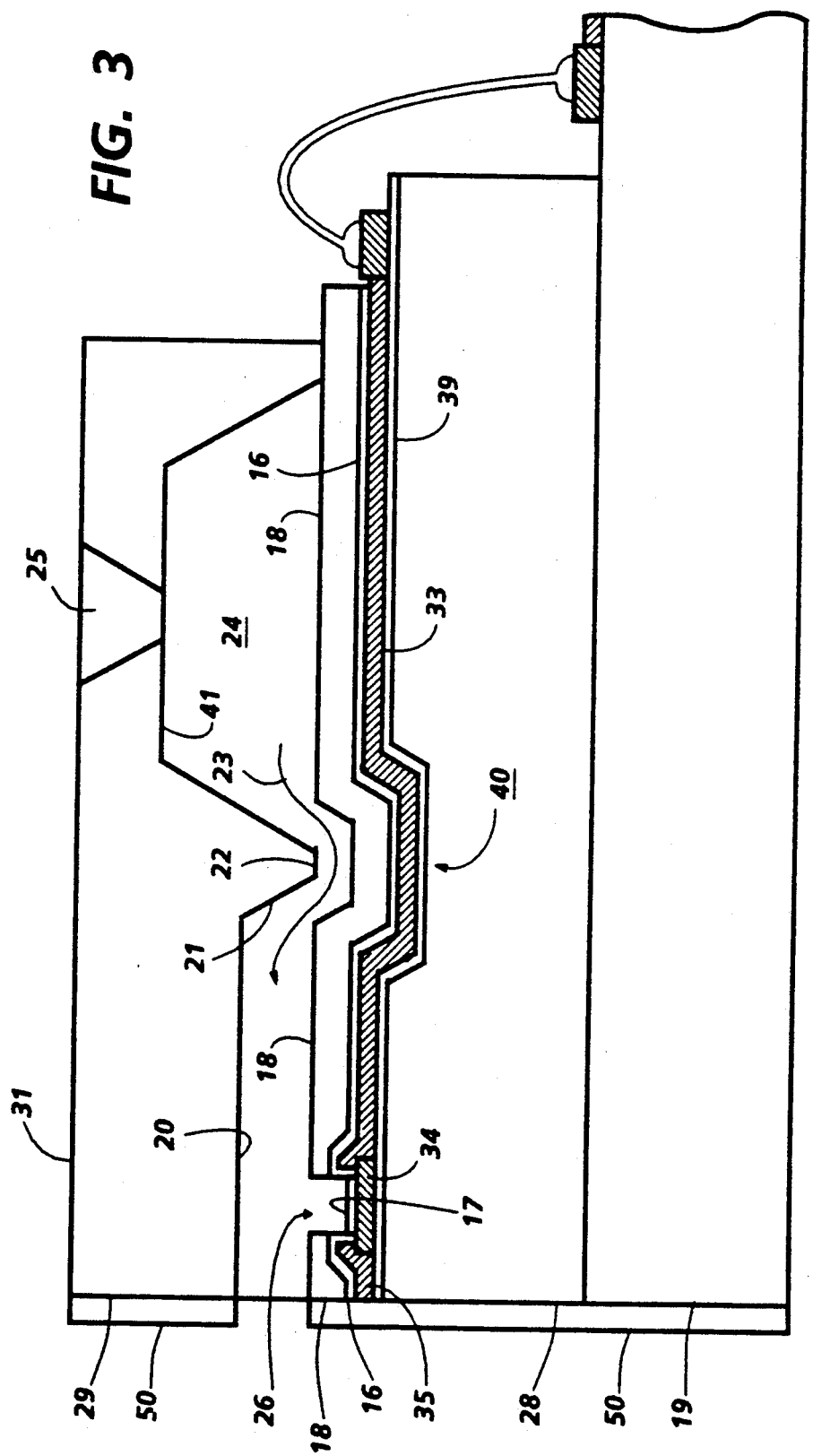
FIG. 3 is an enlarged cross-sectional view of an alternate embodiment of the printhead in FIG. 1 as viewed along the line 2—2 thereof.

FIG. 3 is a similar view to that of FIG. 2 with a shallow anisotropically etched groove 40 in the heater plate, which is silicon, prior to formation of the underglaze 39 and patterning of the heating elements 34, electrodes 33 and common return 35. This recess 40 permits the use of only the thick film insulative layer 18 and eliminates the need for the usual electrode passivating layer 16. Since the thick film layer 18 is impervious to water and relatively thick (typically from about 20 to about 40 microns), contamination introduced into the circuitry will be much less than with only the relatively thin passivation layer 16 well known in the art. The heater plate is a fairly hostile environment for integrated circuits. Commercial ink generally entails a low attention to purity. As a result, the active part of the heater plate will be at elevated temperature adjacent to a contaminated aqueous ink solution which undoubtedly abounds with mobile ions. In addition, it is generally desirable to run the heater plate at a voltage of from about 30 to about 50 volts, so that there will be a substantial field present. Thus, the thick film insulative layer 18 provides improved protection for the active devices and provides improved protection, resulting in longer operating lifetime for the heater plate.

As disclosed in U.S. Pat. No. 4,601,777 and U.S. Pat. No. 4,638,337, the disclosures of each of which are totally incorporated herein by reference, the channel plate is formed from a two side polished, (100) silicon wafer to produce a plurality of upper substrates 31 for the printhead. After the wafer is chemically cleaned, a pyrolytic CVD silicon nitrite layer (not shown) is deposited on both sides. Using conventional photolithography, a via for fill hole 25 for each of the plurality of channel plates 31 and at least two vias for alignment openings (not shown) at predetermined locations are printed on one wafer side. The silicon nitride is plasma etched off of the patterned vias representing the fill holes and alignment openings. A potassium hydroxide (KOH) anisotropic etch can be used to etch the fill holes and alignment openings. In this case, the [111] planes of the (100) wafer generally make an angle of about 54.7 degrees with the surface of the wafer. The fill holes are small square surface patterns, generally of about 20 mils (500 microns) per side and the alignment openings are from about 60 to about 80 mils (1.5 to 3 millimeters) square. Thus, the alignment openings are etched entirely through the 20 mil (0.5 millimeter) thick wafer, while the fill holes are etched to a terminating apex at about halfway through to three-quarters through the wafer. The relatively small square fill hole is invariant to further size increase with continued etching so that the etching of the alignment openings and fill holes are not significantly time constrained. Next, the opposite side of the wafer is photolithographically patterned, using the previously etched alignment holes as a reference to form the relatively large rectangular recesses 24 and sets of elongated, parallel channel recesses that will eventually become the ink manifolds and channels of the printheads. The surface 22 of the wafer containing the manifold and channel recesses are portions of the original wafer surface (covered by a silicon nitride layer) on which adhesive will be applied later for bonding it to the substrate containing the plurality of sets of heating elements. A final dicing cut, which produces end face 29, opens one end of the elongated groove 20 producing nozzles 27. The other ends of the channel groove 20 remain closed by end 21. However, the alignment and bonding of the channel plates to the heater plate places the ends 21 of channels 20 directly over elongated recess 38 in the thick film insulative layer 18 as shown in FIG. 2 or directly above the recess 40 as shown in FIG. 3 enabling the flow of ink into the channels from the manifold as depicted by arrows 23.

As shown in FIGS. 1, 2, and 3, coating 50 is a water-repellent and ink-repellent layer of a polyimide-siloxane copolymer material. As shown in FIG. 1, the coating is partially cut away to show other components of the printhead front face 29. Coating 50 can be of any suitable thickness. Typical coating thicknesses are from about 0.1 microns to about 10 microns, an preferably from about 0.5 microns to about 2 microns, although the thickness can be outside of these ranges.

The printhead illustrated in FIGS. 1 through 3 constitutes a specific embodiment of the present invention. Any other suitable printhead configuration comprising ink-bearing channels terminating in nozzles on the printhead surface can also be employed with the coatings disclosed herein to form a printhead of the present invention.

The water-repellent and ink-repellent coating on the surface or front face of the printhead comprises a polyimide-siloxane block copolymer. As the coating on the printhead wears out, more siloxane is regenerated on the surface of the printhead. Any suitable polyimide-siloxane block copolymer can be employed. Preferably, the siloxane content of the block copolymer is from about 1 to about 60 percent by weight. In a preferred embodiment, the polyimide-siloxane block copolymer is prepared by the condensation of a dianhydride with a diamine and an amine terminated siloxane. For example, the dianhydride can be of the formula

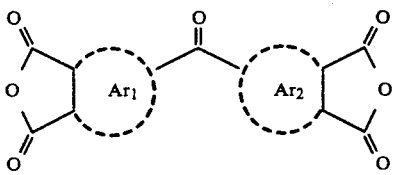

wherein

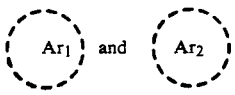

independently represent aromatic groups, such as benzene, naphthalene, anthracene, phenanthrene, or the like. The aromatic groups can be unsubstituted or substituted with one or more substituents, such as alkyl, aryl, halogen, nitro, or the like. Thus, for example, when both aromatic groups are benzene and there are no substituents on the aromatic groups, the dianhydride is of the formula

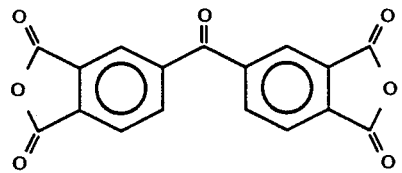

The diamine can be either aliphatic or aromatic. One example of a class of suitable aromatic diamines is that of the general formula

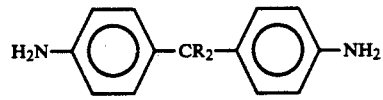

Wherein R is hydrogen or alkyl, such as methyl, ethyl, propyl, or the like. The benzene rings can be unsubstituted or substituted with one or more substituents, such as alkyl, aryl, halogen, nitro, or the like. In addition, the R groups can be substituted with one or more substituents. Other classes of suitable aromatic diamines include those of similar structures wherein the benzene rings are replaced with other aromatic moieties, such as naphthalene, anthracene, phenanthrene, or the like. One example of a suitable class of aliphatic diamines is that of the general formula $$H_2N-(CH_2)_n-NH_2$$

wherein n is a number from about 2 to about 15. Again, the aliphatic diamine can be unsubstituted or substituted with one or more substituents.

The amine terminated siloxane can be of any suitable formula. One example of a suitable class of amine terminated siloxanes is of the general formula

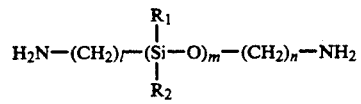

wherein l and n are numbers of from 1 to about 15, m is a number of from 1 to about 100, and $R_1$ and $R_2$ are independently selected from alkyl groups, such as methyl, ethyl, propyl, or the like. A specific example of a material within this class is bis-gamma aminopropyl-tetramethyl-disiloxane, wherein l and n are 3 and m is 2, and wherein $R_1$ and $R_2$ are both methyl. Thus, suitable polyimide-siloxane diblock copolymer for the present invention include those of the general formula

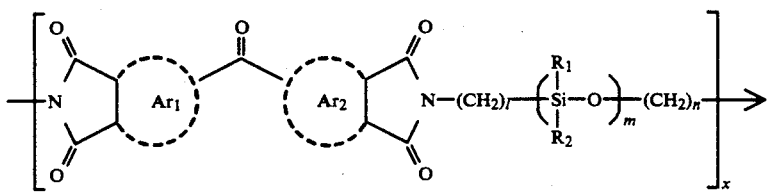

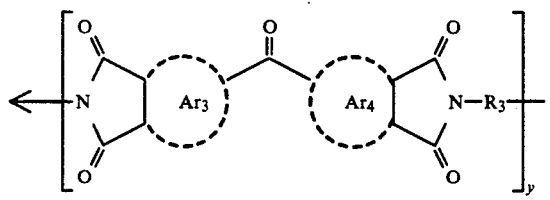

wherein x and y represent the numbers of repeating segments, the dotted circles Ar₁, Ar₂, Ar₃, and Ar₄ are independently selected from aromatic groups, l and n are numbers of from 1 to about 15, m is a number of from 1 to about 100, $R_1$ and $R_2$ are independently selected from alkyl groups, and $R_3$ represents an aliphatic or an aromatic group, and the polymer contains from about 1 to about 30 percent by weight of siloxane.

One specific example of a suitable block copolymer is of the formula

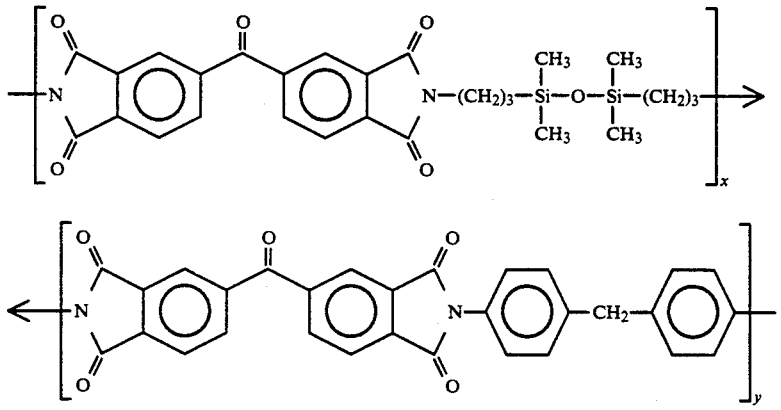

wherein x and y represent the numbers of repeating segments. Other polyimide-siloxane copolymers wherein the siloxane content varies from about 10 percent by weight to about 30 percent by weight are commercially available as, for example, XV-480 ®, available from General Electric Company. Processes for preparing polyimide-siloxane copolymers are known, and are described in, for example, "Polyimides: Synthesis, Characterization, Application," K. L. Mittal, Ed., Plenum, N.Y. pages 847 to 869 (1984), the disclosure of which is totally incorporated herein by reference.

The coating material can be applied to the surface of the printhead where the channels terminate in nozzles by any suitable method. For example, the polyimide-siloxane copolymer can be dissolved in a suitable solvent and applied to the surface by any suitable method, such as by spray coating, spin coating, contact coating by use of brushes, fine bristled brushes, rubber rollers, cotton, cloth or foam rubber (e.g. polyurethane) sponges and applicators, hand coating with a swab such as a Q-tip ® or any other applicator, or the like. Examples of suitable solvents include dichloromethane, methyl ethyl ketone, tetrahydrofuran, N-methylpyrrolidone, and the like. Thus, one embodiment of the present invention is directed to a process for preparing a printhead suitable for ink jet printing which comprises dissolving a polyimide-siloxane copolymer of the formula disclosed herein in a suitable solvent; applying the solution thus formed to an ink jet printhead comprising a plurality of channels, wherein the channels are capable of being filled with ink from an ink supply and wherein the channels terminate in nozzles on one surface of the printhead, the solution being applied to said surface; and allowing the solvent to evaporate, thereby forming a film of the copolymer on said surface.

The ink-repelling coating preferably is applied in a manner which prevents the interior channel walls from becoming coated. If ink-repellent material coats the walls of the channels, proper refill of each channel after firing of a droplet is inhibited, which may result in misdirection or drop size variability. If desired, the ink-repellent coating can be applied to the printhead array face while blowing high velocity filtered gas through the array. In this instance, the strong gas stream inhibits the ink-repellent material from entering the channels and coating the walls. This technique is highly effective for ensuring that only the front face receives a coating of repellent and not the channel walls. The gas can be air, nitrogen, hydrogen, carbon dioxide or any other inert gas.

A fixture can be used wherein a plurality of completed dies are held with the nozzle faces exposed, with a pressurized air or $N_2$ source connected to the fill holes of each die. Gas is blown through the nozzles of each printhead die held by the fixture at the same time that the repellent is applied. This method enables many dies to be treated simultaneously, lowering the repellent treatment cost per die significantly. For an assembled full width ink jet array, the pressurized gas line is connected directly to the ink manifold so gas can be blown through all of the nozzles at the same time while the repellent is applied.

Another method of avoiding coating of the channel walls entails application of the coating to the printhead array face from an intermediate transfer sheet. The coating material is first applied to a flexible transfer sheet, such as ½ mil vinyl or plastic for example, by any suitable method, such as spin coating or the like. While the coating material is still wet on the transfer sheet, the wet surface of the transfer sheet is pressed onto the printhead array face, thus transferring some of the coating material to the printhead front face. The transfer sheet is then removed, and some of the coating material remains on the transfer sheet. This method limits the coating thickness on the printhead front face to a few microns or less, and thus prevents the coating material from entering the channels or coating the channel walls.

Another suitable technique for applying the polyimide-siloxane copolymer to the printhead surface entails applying a thin film of the polyimide-siloxane copolymer to a substrate, such as vinyl, polyester (Mylar ®, for example), or the like, by any suitable coating method, including spin coating, contact coating, spray coating, hand coating, or the like, followed by transferring the film of polyimide-siloxane copolymer from the substrate to the surface of the printhead by contacting the polyimide-siloxane coating to the printhead surface and applying head and pressure to the surface of the substrate not coated with the polyimide-siloxane material. By applying the polyimide-siloxane copolymer to the substrate in a relatively thin layer, such as from about 0.001 to about 10 microns, preferably about 1 micron, the limited thickness of material on the substrate prevents the polyimide-siloxane copolymer from entering the nozzles and coating the channels. Thus, another embodiment of the present invention is directed to a process for preparing a printhead which comprises coating a polyimide-siloxane copolymer of the formula disclosed herein onto at least one surface of a substrate; contacting the coated surface of the substrate to an ink jet printhead comprising a plurality of channels, wherein the channels are capable of being filled with ink from an ink supply and wherein the channels terminate in nozzles on one surface of the printhead, the coated substrate being contacted to said surface; and heating the substrate, thereby causing a film of the copolymer to be transferred from the substrate to said surface.

Ink-repellent films formed polyimide-siloxane copolymers of the above formula display excellent adhesion to both silicon containing materials and to polyimide surfaces, as well as other polymeric surfaces and metallic surfaces, and are insoluble in glycol-containing inks. The copolymer film renders the surface of the printhead highly ink-repellent. Measurements indicate that the treated surface displays a contact angle for distilled water of between 85° and 95°. Fluid build-up is effectively prevented on the face of the array in the vicinity of the nozzles. Further, accumulation of debris on the array face is suppressed. The coatings also exhibit good film forming characteristics, good mechanical properties, and good abrasion resistance. Additionally, the polymer employed as a coating for the present invention is sufficiently flexible to enable design of the polymer structure to tailor mechanical and surface properties as desired; for example, the amount of siloxane in the polymer can be varied over a relatively wide range, thus affecting the overall flexibility and the surface characteristics of the coating.

The present invention also encompasses printing processes with printheads according to the present invention. One embodiment of the present invention is directed to an ink jet printing process which comprises (1) providing an ink jet printhead comprising a plurality of channels, wherein the channels are capable of being filled with ink from an ink supply and wherein the channels terminate in nozzles on one surface of the printhead, the surface being coated with a polyimide-siloxane copolymer of the formula disclosed herein; (2) filling the channels with an ink; and (3) causing droplets of ink to be expelled from the nozzles onto a receiver sheet in an image pattern. A specific embodiment of this process is directed to a thermal ink jet printing process, wherein the droplets of ink are caused to be expelled from the nozzles by heating selected channels in an image pattern. The droplets can be expelled onto any suitable receiver sheet, such as fabric, plain paper such as Xerox ® 4024 or 4010, coated papers, transparency materials, or the like.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A polyimide-siloxane copolymer was prepared as follows. To a 1 liter round bottom flask equipped with a distillation apparatus was added 500 milliliters of N-methylpyrrolidone. Thereafter, 50 grams of benzophenone dianhydride (obtained from Aldrich) was dissolved in the N-methylpyrrolidone in the flask. Subsequently, a mixture of 50 grams of methylene dianiline (obtained from Aldrich) and bis-gamma aminopropyl-tetramethyldisiloxane (obtained from Petrash Systems) in a ratio of 7:3 was added to the above solution. The contents of the flask were subsequently maintained at room temperature for 24 hours. The resulting solution of the polyamic acid, which is a random copolymer, was heated to distill off the solvent. A fresh batch of 400 milliliters of the solvent was then added to the flask and the contents were then distilled to dryness under vacuum (10 mm Hg). The process of adding a fresh batch of solvent and distilling to dryness under vacuum was repeated two more times, thereby azeotropically removing water, a reaction byproduct, from the reaction mixture. The light yellowish semisolid thus obtained was once again dissolved in 500 milliliters of N-methylpyrrolidone by stirring and warming to about 70° C. The resulting solution was then added dropwise to a stirring 2 liters of methanol in a 4 liter beaker. The methanol was vigorously stirred during the addition. Thereafter a solid precipitated and was collected by filtration and washed three times with 100 milliliter aliquots of methanol. Upon drying of the solid, the product was identified as a block copolymer of polyimide and siloxane by nuclear magnetic resonance spectra ($^1$H-nmr, $^{13}$C-nmr, and $^{29}$Si-nmr) and an infrared spectrum.

A solution of the polyimide-siloxane block copolymer thus obtained was prepared by dissolving 1 gram of the polymer in 100 milliliters of dichloromethane, and the solution was applied to a polished 3 inch diameter by 20 mil thick silicon wafer by spin coating, resulting in formation on the surface of the silicon wafer of a coating of the polyimide-siloxane copolymer in a thickness of 1 micron.

The coated silicon wafer was then immersed in a vessel containing a mixture comprising 50 percent by weight ethylene glycol and 50 percent by weight water. This liquid mixture represents a typical ink jet ink liquid vehicle. The vessel containing the mixture and the coated wafer was then stirred vigorously and heated to 80° C. to accelerate physical and chemical degradation of the copolymer. The wafer was removed from the mixture periodically, the contact angle measurements of water on the surface were made. Contact angle represents the angle a drop of liquid makes with respect to a surface on which it is situated; a contact angle of greater than 90 degrees indicates a non-wetting condition and a low contact angle of much less than 90 degrees represents a wetting condition. Low surface energies generally result in high contact angles and high surface energies generally result in low contact angles. Table 1 below indicates the contact angle observed at various times during the procedure.

| Time (hours) | Contact Angle (degrees) |
| --- | --- |
| 0 (prior to immersion) | 89 |
| 24 | 88 |
| 40 | 80 |
| 48 | 77 |
| 64 | 78 |
| 72 | 87 |
| 88 | 88 |
| 96 | 90 |
| 120 | 88 |

As can be seen from the table, throughout the process, the contact angle remained relatively constant over the 5 day period, ranging from 77 to 90 degrees. Generally, a contact angle of 75 degrees or greater is sufficient to prevent accumulation of ink on a printhead surface and thus prevent misdirection.

Other embodiments and modifications of the present invention may occur to those skilled in the art subsequent to a review of the information presented herein; these embodiments and modifications, as well as equivalents thereof, are also included within the scope of this invention.

What is claimed is:

1. An ink jet printhead comprising a plurality of channels, wherein the channels are capable of being filled with ink from an ink supply and wherein the channels terminate in nozzles on one surface of the printhead, the surface being coated with a polyimide-siloxane block copolymer.

2. A printhead according to claim 1 wherein the polyimide-siloxane block copolymer has a siloxane content of from about 1 to about 30 percent by weight.

3. A printhead according to claim 1 wherein the coating of the polyimide-siloxane copolymer has a thickness of from about 0.001 to about 10 microns.

4. A printhead according to claim 1 wherein the printhead surface coated with the polyimide-siloxane block copolymers is of a material selected from the group consisting of silicon containing compounds, polyimides, and mixtures thereof.

5. A printhead according to claim 1 wherein the polyimide-siloxane block copolymer is of the formula

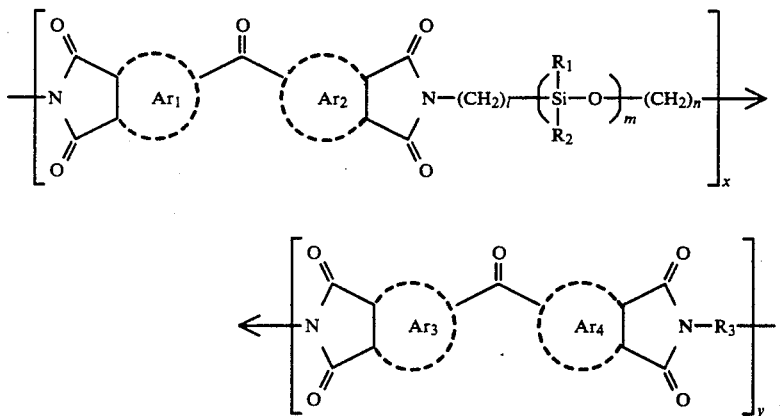

wherein x and y represent the numbers of repeating segments, the dotted circles $Ar_1$, $Ar_2$, $Ar_3$, and $Ar_4$ are independently selected from aromatic groups, l and n are numbers of from 1 to about 15, m is a number of from 1 to about 100, $R_1$ and $R_2$ are independently selected from alkyl groups, and $R_3$ represents an aliphatic or an aromatic group, and the polymer contains from about 1 to about 30 percent by weight of siloxane.

6. A printhead according to claim 1 wherein the polyimide-siloxne block copolymer is of the formula

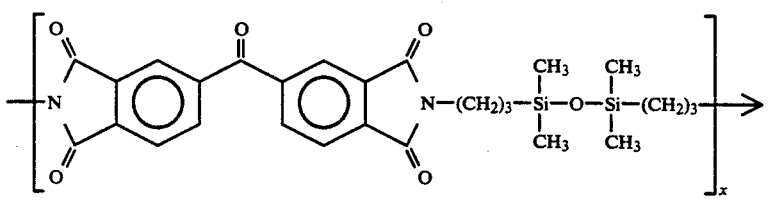

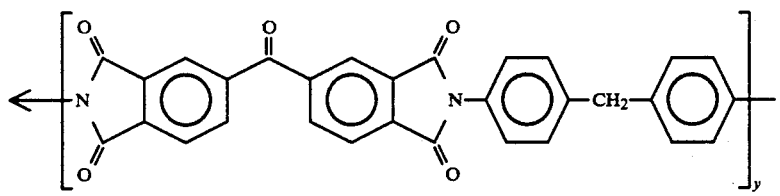

wherein x and y represent the numbers of repeating segments.

7. A process for preparing a printhead suitable for ink jet printing which comprises dissolving a polyimide-siloxane block copolymer in a suitable solvent; applying the solution thus formed to an ink jet printhead comprising a plurality of channels, wherein the channels are capable of being filled with ink from an ink supply and wherein the channels terminate in nozzles on one surface of the printhead, the solution being applied to said surface; and allowing the solvent to evaporate, thereby forming a film of the copolymer on said surface.

8. A process according to claim 7 wherein the copolymer film has a thickness of from about 0.001 to about 10 microns.

9. A process according to claim 7 wherein a gas is passed through the channels while the solution is applied to the surface of the printhead.

10. A process according to claim 7 wherein the polyimide-siloxane block copolymer is of the formula independently selected from aromatic groups, l and n are numbers of from 1 to about 15, m is a number of from 1 to about 100, $R_1$ and $R_2$ are independently selected from alkyl groups, and $R_3$ represents an aliphatic or an aromatic group, and the polymer contains from about 1 to about 30 percent by weight of siloxane.

11. A process according to claim 7 wherein the polyimide-siloxane block copolymer is of the formula

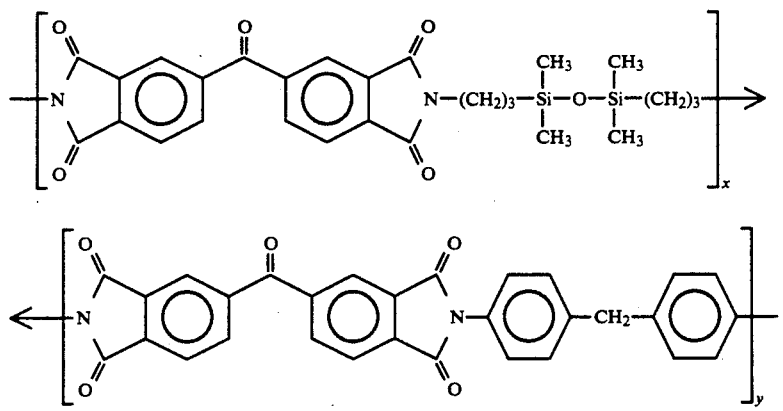

wherein x and y represent the numbers of repeating segments.

12. A process for preparing a printhead which comprises coating a polyimide-siloxane block copolymer onto at least one surface of a substrate; contacting the coated surface of the substrate to an ink jet printhead comprising a plurality of channels, wherein the channels are capable of being filled with ink from an ink supply and wherein the channels terminate in nozzles on one surface of the printhead, the coated substrate being contacted to said surface; and causing a film of the copolymer to be transferred from the substrate to said surface.

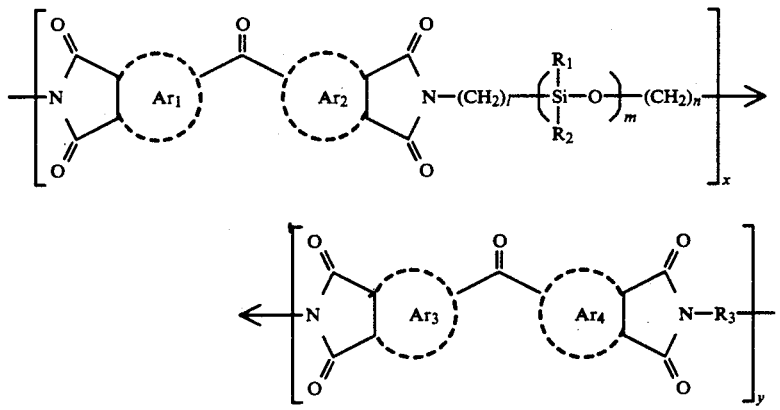

wherein x and y represent the numbers of repeating segments, the dotted circles $Ar_1$, $Ar_2$, $Ar_3$, and $Ar_4$ are 13. A process according to claim 12 wherein the copolymer film on the surface of the printhead has a thickness of from about 0.001 to about 10 microns.

14. An ink jet printing process which comprises (1) providing an ink jet printhead comprising a plurality of channels, wherein the channels are capable of being filled with ink from an ink supply and wherein the channels terminate in nozzles on one surface of the printhead, the surface being coated with a polyimide-siloxane block copolymer; (2) filling the channels with an ink; and (3) causing droplets of ink to be expelled from the nozzles onto a receiver sheet in an image pattern.

15. An ink jet printing process according to claim 14 wherein the polyimide-siloxane block copolymer is of the formula

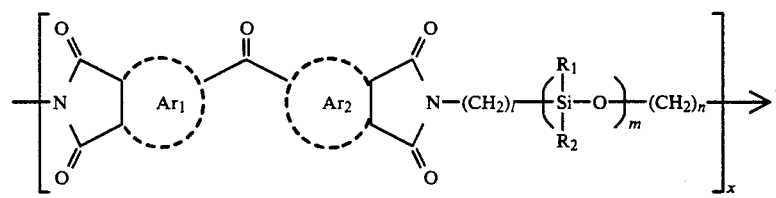

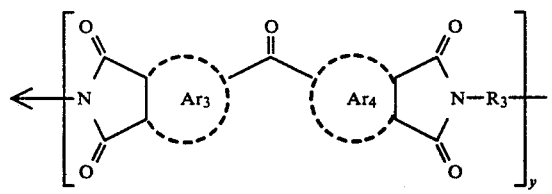

wherein x and y represent the numbers of repeating segments, the dotted circles $Ar_1$, $Ar_2$, $Ar_3$, and $Ar_4$ are independently selected from aromatic groups, l and n are numbers of from 1 to about 15, m is a number of from 1 to about 100, $R_1$ and $R_2$ are independently selected from alkyl groups, and $R_3$ represents an aliphatic or an aromatic group, and the polymer contains from about 1 to about 30 percent by weight of siloxane.

16. An ink jet printing process according to claim 14 wherein the polyimide-siloxane block copolymer is of the formula

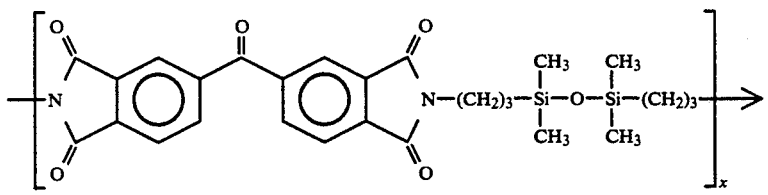

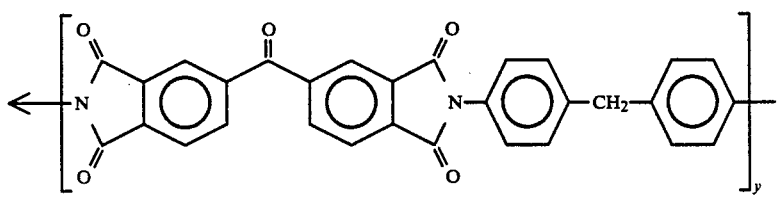

wherein x and y represent the numbers of repeating segments.

17. A thermal ink jet printing process which comprises (1) providing an ink jet printhead comprising a plurality of channels, wherein the channels are capable of being filled with ink from an ink supply and wherein the channels terminate in nozzles on one surface of the printhead, the surface being coated with a polyimide-siloxane block copolymer; (2) filling the channels with an ink; and (3) heating selected channels, thereby causing droplets of ink to be expelled from the nozzles onto a receiver sheet in an image pattern.

18. A thermal ink jet printing process according to claim 17 wherein the polyimide-siloxane block copolymer is of the formula

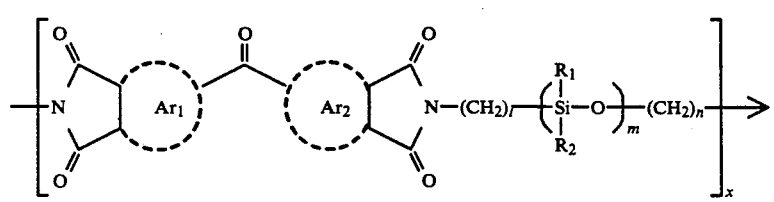

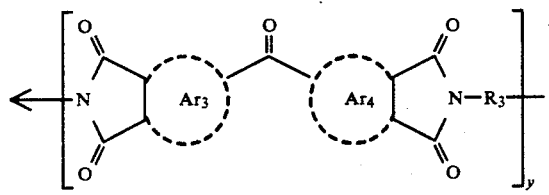

wherein x and y represent the numbers of repeating segments, the dotted circles Ar$_1$, Ar$_2$, Ar$_3$, and Ar$_4$ are independently selected from aromatic groups, l and n are numbers of from 1 to about 15, m is a number of from 1 to about 100, R$_1$ and R$_2$ are independently selected from alkyl groups, and R$_3$ represents an aliphatic or an aromatic group, and the polymer contains from about 1 to about 30 percent by weight of siloxane.

19. A thermal ink jet printing process according to claim 17 wherein the polyimide-siloxane block copolymer is of the formula

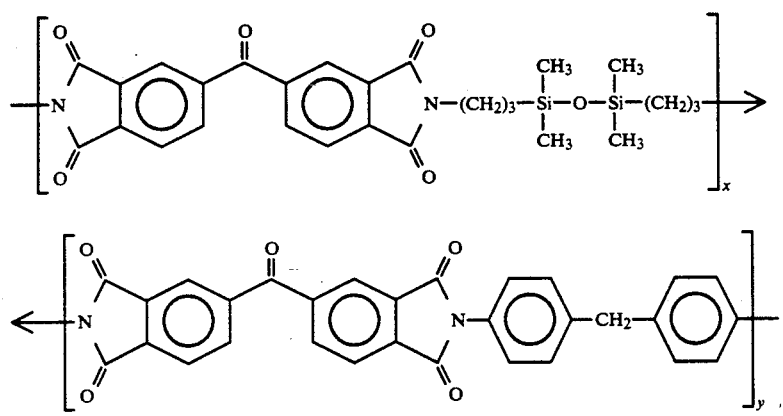

wherein x and y represent the numbers of repeating segments.

* * * * *